US012694809B2

(12) United States Patent
Zhang

(10) Patent No.: US 12,694,809 B2
(45) Date of Patent: Jul. 28, 2026

(54) DISPLAY PANEL, DIMMING METHOD THEREOF, AND DISPLAY DEVICE

(71) Applicant: Xiamen Tianma Display Technology Co., Ltd., Xiamen (CN)

(72) Inventor: Yuheng Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 36 days.

(21) Appl. No.: 18/379,032

(22) Filed: Oct. 11, 2023

(65) Prior Publication Data

US 2024/0038119 A1 Feb. 1, 2024

(30) Foreign Application Priority Data

Jul. 3, 2023 (CN) ......................... 202310810497.2

(51) Int. Cl.
*G09G 3/20* (2006.01)

(52) U.S. Cl.
CPC ........... *G09G 3/20* (2013.01); *G09G 2310/06* (2013.01); *G09G 2320/0233* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 7,253,440 | B1 * | 8/2007 | Takemura | H01L 27/124 257/E27.111 |
| 2002/0005861 | A1 * | 1/2002 | Lewis | G09G 3/3406 345/691 |
| 2006/0043371 | A1 * | 3/2006 | Steer | G09G 3/3258 257/72 |
| 2020/0082768 | A1 * | 3/2020 | Oh | G09G 3/3291 |
| 2021/0225262 | A1 * | 7/2021 | Liu | G09G 3/2022 |
| 2023/0335069 | A1 * | 10/2023 | Liu | G09G 3/3406 |
| 2023/0401996 | A1 * | 12/2023 | Su | G09G 3/32 |

FOREIGN PATENT DOCUMENTS

| | | | |
|---|---|---|---|
| CN | 112071274 | A | 12/2020 |
| CN | 115547236 | A | 12/2022 |
| CN | 115602107 | A | 1/2023 |

* cited by examiner

*Primary Examiner* — Christopher R Lamb
(74) *Attorney, Agent, or Firm* — KDW FIRM PLLC

(57) ABSTRACT

Provided are a display panel, a dimming method thereof, and a display device. When the display panel displays a frame of image, a light emission control signal corresponding to a row of sub-pixels in the display panel includes N pulse periods. N is a positive integer. A pulse period includes first level pulses. The first level pulses include a first target level pulse and a first non-target level pulse. The pulse width of the first target level pulse is different from the pulse width of the first non-target level pulse.

15 Claims, 12 Drawing Sheets

DISPLAY PANEL, DIMMING METHOD THEREOF, AND DISPLAY DEVICE

CROSS-REFERENCE TO RELATED APPLICATION(S)

This application claims the priority of Chinese Patent Application No. 202310810497.2, filed on Jul. 3, 2023, the disclosure of which is incorporated herein by reference in its entirety.

TECHNICAL FIELD

The present application belongs to the field of display technology and, in particular, to a display panel, a dimming method thereof, and a display device.

BACKGROUND

With the development of technology, more and more electronic devices having display functions are widely used in people's daily life and work. The main component of an electronic device for implementing a display function is a display panel. The current display panel may include, for example, a liquid crystal display panel and an organic light-emitting display panel.

To be suitable for use in different environments, a display panel needs to have a brightness adjustable function while ensuring normal display. However, the inventors of the present application find that the current display panel has a problem of low dimming accuracy.

SUMMARY

Embodiments of the present application provide a display panel, a dimming method thereof, and a display device.

In a first aspect, an embodiment of the present application provides a display panel. When the display panel displays a frame of image, a light emission control signal corresponding to a row of sub-pixels in the display panel includes N pulse periods. N is a positive integer. A pulse period includes first level pulses. The first level pulses include a first target level pulse and a first non-target level pulse. The pulse width of the first target level pulse is different from the pulse width of the first non-target level pulse.

In a second aspect, an embodiment of the present application provides a dimming method of a display panel. The display panel includes the display panel provided in the first aspect. The dimming method of a display panel includes adjusting the pulse width of the first target level pulse in a pulse period to a first target pulse width. The first target pulse width is different from the pulse width of the first non-target level pulse.

In a third aspect, an embodiment of the present application provides a display device. The display device includes the display panel provided in the first aspect.

In the display panel, the dimming method thereof, and the display device according to the embodiments of the present application, when the display panel displays a frame of image, the light emission control signal corresponding to a row of sub-pixels in the display panel includes N pulse periods. N is a positive integer. A pulse period includes first level pulses. The first level pulses include a first target level pulse and a first non-target level pulse. The pulse width of the first target level pulse is different from the pulse width of the first non-target level pulse.

BRIEF DESCRIPTION OF DRAWINGS

To more clearly illustrate the technical solutions of embodiments of the present application, the accompanying drawings used in the embodiments of the present application are briefly described below. Those of ordinary skill in the art may obtain other drawings according to these drawings on the premise that no creative work is done.

DETAILED DESCRIPTION

Figure 1:
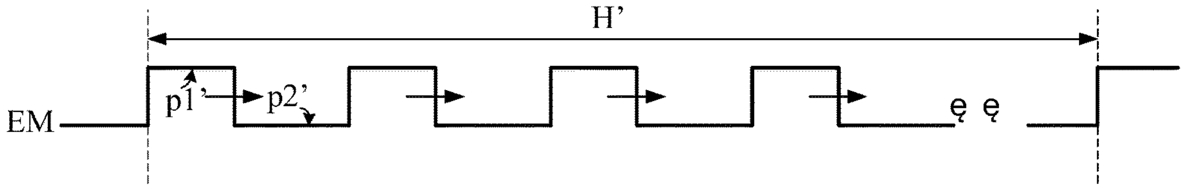
FIG. 1 is an operation diagram of PWM dimming in the related art.

Features and example embodiments of various aspects of the present application are described in detail below. To make the objects, solutions, and advantages of the present application clearer, the present application is further described in detail below in conjunction with drawings and specific embodiments. It is to be understood that the specific embodiments set forth below are merely intended to illustrate and not to limit the present application. For those skilled in the art, the present application may be implemented without some of these specific details. The description below of embodiments is merely intended to provide a better understanding of the present application by showing examples of the present application.

It should also be noted that in the present application, relationship terms such as a first and a second are used merely to distinguish one entity or operation from another. It does not necessarily require or imply any such actual relationship or order between these entities or operations. Furthermore, the term "comprising", "including" or any other variant thereof is intended to encompass a non-exclusive inclusion so that a process, method, article, or device that includes a series of elements not only includes those elements but may also include other elements that are not expressly listed or are inherent to such process, method, article, or device. In the absence of more restrictions, the elements defined by the statement "including . . . " do not exclude the presence of additional identical elements in the process, method, article or device that includes the elements.

It should be understood that the term "and/or" in the present application merely describes the association relationships of associated objects and indicates that three relationships may exist. For example, A and/or B may indicate three conditions of A alone, both A and B, and B alone. In addition, the character "/" of the present application generally indicates that the front and rear associated objects are in an "or" relationship.

In the embodiments of the present application, the term "electrical connection" may refer to a direct electrical connection between two components or may refer to an electrical connection between two components through one or more other components.

It is apparent for those skilled in the art that various modifications and changes in the present application may be made without departing from the spirit or scope of the present application. Accordingly, the present application is intended to cover modifications and variations of the present application that fall within the scope of the appended claims (the claimed technical solutions) and their equivalents. It is to be noted that the embodiments of the present application, if not in collision, may be combined with one another.

Before the technical solutions provided in the embodiments of the present application are explained, to facilitate understanding of the embodiments of the present application, the present application first specifically describes the problems existing in the related art.

To be suitable for use in different environments, a display panel needs to have a brightness adjustable function while ensuring normal display. At present, two main brightness adjustment methods below may be included.

(1) A direct current signal is controlled to adjust brightness, that is, direct current (DC) dimming. The main implementation method of DC dimming is to control a data voltage or a power voltage to implement drive currents of different magnitudes, thereby adjusting the brightness.

(2) The pulse width of a switch signal is controlled to adjust brightness, that is, pulse-width modulation (PWM) dimming. The PWM dimming may control the light emitting time by changing the number of pulses and the pulse width of the switch signal of a transistor that needs to be turned on in a light emission stage, thereby implementing the purpose of adjusting the brightness.

When DC dimming is used, since compensation cannot be performed at low brightness, the display effect is deteriorated. For this reason, PWM dimming is generally used at low brightness.

FIG. 1 is an operation diagram of PWM dimming in the related art. As shown in FIG. 1, when the refresh rate (or refresh frequency) of a display panel is high, in one frame of time H', the number of pulses of a light emission control signal EM is relatively large. For example, the light emission control signal EM may include multiple non-enable level pulses p1' and multiple enable level pulses p2'. The non-enable level pulses p1' and the enable level pulses p2' are arranged alternately. When PWM dimming is performed, in the related art, generally, the pulse widths of the multiple non-enable level pulses p1' may be uniformly adjusted. For example, the pulse widths of the multiple non-enable level pulses p1' are simultaneously increased, or the pulse widths of the multiple non-enable level pulses p1' are simultaneously decreased. For example, when the light emission control signal EM includes 32 non-enable level pulses p1', generally, the pulse widths of the 32 non-enable level pulses p1' may be simultaneously increased, or the pulse widths of the 32 non-enable level pulses p1' may be simultaneously decreased.

In this manner, since the pulse widths of the multiple non-enable level pulses p1' change, the duty cycle of the light emission control signal may also change greatly. Table 1 schematically shows the relationship between the pulse width of a non-enable level pulse p1' and the duty cycle of the light emission control signal.

TABLE 1

| Pulse Width/H of a Single Non-enable Level Pulse p1' | Duty Cycle of a Light Emission Control Signal |
|---|---|
| . . . | . . . |
| 60 | 22.6% |
| 64 | 17.4% |
| 68 | 12.3% |
| . . . | . . . |

As shown in table 1, an example in which the light emission control signal EM includes 32 non-enable level pulses p1' is still used. When the pulse widths of the 32 non-enable level pulses p1' are adjusted from 60H to 64H, the duty cycle of the light emission control signal may directly decrease from 22.6% to 17.4%. The duty cycle of the light emission control signal in the range between 17.4% and 22.6% cannot be adjusted well. As a result, the brightness adjustment range of the display panel is relatively rough, and the dimming accuracy of the display panel is relatively low.

In addition, for example, for a hybrid TFT display (HTD) display panel, since the HTD display panel needs a relatively large pulse width of a non-enable level pulse p1' of the light emission control signal EM, if the pulse widths of all the non-enable level pulses p1' are adjusted to relatively large pulse widths, the duty cycle of the light emission control signal may be small. As a result, the brightness of the display panel may be low. For this reason, to make the brightness of the display panel reach expected brightness, it is necessary to additionally adjust a data voltage to perform DC dimming, and the adjustment range of the data voltage is large. As a result, the power consumption increases.

In view of the preceding research findings of inventors, the embodiments of the present application provide a display panel, a dimming method thereof, and a display device. Thus, at least one of the preceding technical problems existing in the related art can be solved.

The technical conception of the embodiments of the present application is that the pulse width of a first target level pulse in a light emission control signal is different from the pulse width of a first non-target level pulse, that is, the pulse widths of partial first level pulses (for example, a first target level pulse) in the light emission control signal may be adjusted. In one aspect, the pulse widths of partial first level pulses (for example, a first target level pulse) in the light emission control signal are adjusted, so that the duty cycle of the light emission control signal may be adjusted in a wider range. Moreover, the brightness adjustment range may be finer, and the dimming accuracy of the display panel is improved. In another aspect, since a first target level pulse or a first non-target level pulse having a relatively small pulse width is present in the light emission control signal, the light emission control signal may still maintain a high duty cycle, thereby ensuring that the brightness of the display panel can reach expected brightness. Thus, there is no need to perform direct current (DC) dimming in a manner of adjusting a data voltage. Alternatively, even if DC dimming is performed, the adjustment range of the data voltage can be reduced. In this manner, the power consumption is reduced.

Firstly, the display panel provided by the embodiments of the present application is introduced below.

Figure 2:
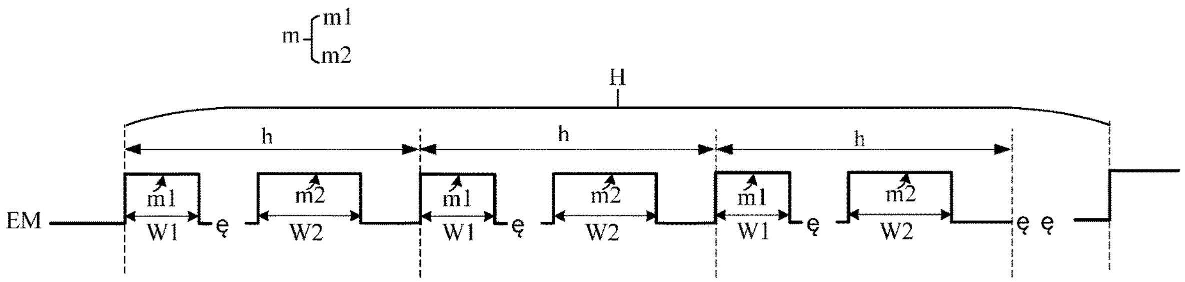
FIG. 2 is a waveform diagram of a light emission control signal of a display panel in one frame of time according to an embodiment of the present application.

FIG. 2 is a waveform diagram of a light emission control signal of a display panel in one frame of time according to an embodiment of the present application. As shown in FIG. 2, when the display panel displays a frame of image, the light emission control signal EM corresponding to a row of sub-pixels in the display panel may include N pulse periods h. N is a positive integer. The size of N may be adjusted flexibly according to actual conditions. This is not limited in this embodiment of the present application. The light emission control signal may control the light emission control transistor in the pixel circuit of the display panel to be turned on/off. For example, when the light emission control signal is an enable level pulse, the light emission control transistor in the pixel circuit may be controlled to be turned on. In this manner, the pixel circuit provides a drive current to a light-emitting element to drive the light-emitting element to emit light. For example, when the light emission control signal is a non-enable level pulse, the light emission control transistor in the pixel circuit may be controlled to be turned off. In this manner, the light-emitting element does not emit light.

Unless otherwise specified, the drawings of the embodiments of the present application are illustrated by using an example in which the light emission control transistor is a p-type transistor, and the non-enable level pulse is a high-level pulse. However, when the light emission control transistor is an n-type transistor, the non-enable level pulse may be a low-level pulse. This is not limited in the embodiments of the present application.

A pulse period h may include first level pulses m. For example, the first level pulses m may include non-enable level pulses, for example, high-level pulses shown in FIG. 2. The first level pulses m may include a first target level pulse m1 and a first non-target level pulse m2. The pulse width W1 of the first target level pulse m1 is different from the pulse width W2 of the first non-target level pulse m2. That is, the first target level pulse m1 and the first non-target level pulse m2 may be non-enable level pulses. However, the pulse width W1 of the first target level pulse m1 is different from the pulse width W2 of the first non-target level pulse m2. For example, the pulse width W1 of the first target level pulse m1 may be flexibly adjusted.

For example, in some embodiments, the pulse width W2 of the first non-target level pulse m2 may be fixed, and the pulse width W1 of the first target level pulse m1 is adjusted, so that the duty cycle of the light emission control signal is adjusted, and thus the brightness is adjusted.

In this embodiment of the present application, the size of the pulse width W1 of the first target level pulse m1 and the size of the pulse width W2 of the first non-target level pulse m2 are not limited. For example, in some embodiments, W1 may be smaller than W2. Optionally, W1 may also be larger than W2.

In the display panel of this embodiment of the present application, when the display panel displays a frame of image, the light emission control signal corresponding to a row of sub-pixels in the display panel includes N pulse periods. N is a positive integer. A pulse period includes first level pulses. The first level pulses include a first target level pulse and a first non-target level pulse. The pulse width of the first target level pulse is different from the pulse width of the first non-target level pulse. In one aspect, the pulse widths of partial first level pulses (for example, a first target level pulse) in the light emission control signal are adjusted, so that the duty cycle of the light emission control signal may be adjusted in a wider range. Moreover, the brightness adjustment range may be finer, and the dimming accuracy of the display panel is improved. In another aspect, since a first target level pulse or a first non-target level pulse having a relatively small pulse width is present in the light emission control signal, the light emission control signal may still maintain a high duty cycle, thereby ensuring that the brightness of the display panel can reach the expected brightness. Thus, there is no need to perform direct current (DC) dimming in a manner of adjusting a data voltage. Alternatively, even if DC dimming is performed, the adjustment range of the data voltage can be reduced. In this manner, the power consumption is reduced.

For example, the light emission control signal EM includes 16 first target level pulses m1 and 16 first non-target level pulses m2. Assuming that the pulse width W1 of the first target level pulse m1 is 4H, and the pulse width W2 of the first non-target level pulse m2 is 64H, at this time, the duty cycle of the light emission control signal is 56.1%. Compared with 17.4% in FIG. 1 and table 1, the duty cycle of the light emission control signal is greatly improved. Thus, there is no need to perform direct current (DC) dimming in a manner of adjusting a data voltage. Alternatively, even if DC dimming is performed, the adjustment range of the data voltage can be reduced. In this manner, the power consumption is reduced.

With continued reference to FIG. 2, according to some embodiments of the present application, optionally, the pulse widths W1 of first target level pulses m1 in at least two pulse periods h of the N pulse periods are the same, and/or, the pulse widths W2 of first non-target level pulses m2 in the at least two pulse periods h of the N pulse periods are the same. That is, the first target level pulses m1 in the at least two pulse periods h of the N pulse periods use the same pulse width, and/or, the first non-target level pulse m2 in the at least two pulse periods h of the N pulse periods use the same pulse width.

Thus, since the pulse widths W1 of first target level pulses m1 in at least two pulse periods h are the same, and/or the pulse widths W2 of first non-target level pulses m2 in the at least two pulse periods h are the same, the pulses of the light emission control signal may be made relatively uniform, and the complexity of the light emission control signal is reduced. At the same time, it is beneficial to make waveforms or the proportions of light emitting time of different pulse periods h the same or similar, and brightness jumps between different pulse periods h are reduced.

For example, in some specific embodiments, the pulse widths W1 of first target level pulses m1 of the N pulse periods h may be the same, and/or, the pulse widths W2 of first non-target level pulses m2 of the N pulse periods h may be the same.

Thus, the complexity of the light emission control signal may be reduced to a large extent. In this manner, the waveforms or the proportions of light emitting time of different pulse periods h are the same, and the brightness jumps between different pulse periods h are reduced to a large extent.

According to some embodiments of the present application, optionally, the pulse width W1 of the first target level pulse m1 can be determined according to a target duty cycle of the light emission control signal expected to be reached.

Specifically, when the expected target duty cycle of the light emission control signal is different, the pulse width W1 of the first target level pulse m1 may also be different. The duty cycle of the light emission control signal may be negatively correlated with the pulse width W1 of the first target level pulse m1. That is, the larger the target duty cycle of the light emission control signal is, the smaller the pulse width W1 of the first target level pulse m1 is.

Thus, after the target duty cycle of the light emission control signal is determined, the size of the pulse width W1 of the first target level pulse m1 may be determined according to the target duty cycle of the light emission control signal. In this manner, the pulse width of the first target level pulse m1 is adjusted according to the determined pulse width W1 of the first target level pulse m1, so that it is possible to ensure that the duty cycle of the light emission control signal reaches the target duty cycle.

In some specific embodiments, optionally, the pulse width of the first target level pulse may be determined according to the target duty cycle and the predetermined correspondence between the pulse width of the first target level pulse and the duty cycle of the light emission control signal.

As previously described, the duty cycle of the light emission control signal is negatively correlated with the pulse width of the first target level pulse. Then, for example, the correspondence between the pulse width of the first target level pulse and the duty cycle of the light emission control signal may be determined through the historical data of the pulse width of the first target level pulse and the historical data of the duty cycle of the light emission control signal.

As shown in FIG. 2, for example, in some embodiments, first target level pulses m1 of the N pulse periods h may use the same pulse width W1, and first non-target level pulses m2 of the N pulse periods h may use the same pulse width W2. The pulse width W2 of a first non-target level pulse m2 is predetermined. The duty cycle of the light emission control signal changes with the change of the pulse width W1 of the first target level pulse m1. Then, for example, the duty cycle of the light emission control signal corresponding to the first target level pulse m1 at different pulse widths W1 may be acquired. Thus, the correspondence between the pulse width of the first target level pulse and the duty cycle of the light emission control signal is determined according to multiple groups of different pulse widths W1 and the duty cycles of the light emission control signals corresponding to the multiple groups of different pulse widths W1.

Table 2 schematically shows the correspondence between the pulse width of the first target level pulse and the duty cycle of the light emission control signal.

TABLE 2

| Pulse Width/H of a Single First Target Level Pulse | Duty Cycle of a Light Emission Control Signal |
|---|---|
| W1-1 | D1 |
| W1-2 | D2 |
| W1-3 | D3 |
| W1-4 | D4 |
| . . . | . . . |

In combination with FIG. 2 and table 2, for example, when the pulse width of each first target level pulse m1 in a pulse period h is W1-1, the duty cycle of the light emission control signal is D1. When the pulse width of the first target level pulse m1 in the pulse period h is W1-2, for example, the duty cycle of the light emission control signal is D2. When the pulse width of the first target level pulse m1 in the pulse period h is W1-3, for example, the duty cycle of the light emission control signal is D3.

The specific sizes of W1-1, W1-2, W1-3, and W1-4 in table 2 may be flexibly adjusted according to actual conditions. The specific sizes of D1, D2, D3, and D4 in table 2 may be flexibly adjusted according to actual conditions. This is not limited in this embodiment of the present application.

Thus, the pulse width of the first target level pulse corresponding to the target duty cycle may be directly determined according to the target duty cycle and the predetermined correspondence between the pulse width of the first target level pulse and the duty cycle of the light emission control signal, so that it is possible to ensure that the duty cycle of the light emission control signal reaches the target duty cycle, and at the same, the time required to determine the pulse width of the first target level pulse is saved.

In other specific embodiments, optionally, the pulse width of the first target level pulse may be calculated according to the following expression (1):

$$D=1-(W1*n1+W2*n2)/V \quad (1).$$

Where D denotes the target duty cycle of the light emission control signal. W1 denotes the pulse width of the first target level pulse. W2 denotes the pulse width of the first non-target level pulse. n1 denotes the number of first target level pulses in the N pulse periods. n2 denotes the number of first non-target level pulses in the N pulse periods. V denotes the number of rows of sub-pixels in the display panel.

As shown in FIG. 2, for example, in some embodiments, first target level pulses m1 of the N pulse periods h may use the same pulse width W1, and first non-target level pulses m2 of the N pulse periods h may use the same pulse width W2. The pulse width W2 of a first non-target level pulse m2 is predetermined. The number n1 of first target level pulses m1 in the N pulse periods h and the number n2 of first non-target level pulses m2 in the N pulse periods h may be predetermined. The number V of rows of sub-pixels in the display panel may also be predetermined, that is, the display panel includes V rows of sub-pixels. V is a positive integer.

Thus, after the target duty cycle D of the light emission control signal is determined, the pulse width W1 of the first target level pulse may be calculated according to the preceding expression (1). For example, it is assumed that n1=16, n2=16, V=2800, W2=64H, and D=61.14%. W1≅4H may be calculated according to the preceding expression (1). ≅ denotes equal to or approximately equal to.

Thus, the pulse width of the first target level pulse corresponding to the target duty cycle may be directly calculated through the preceding expression (1), so that it is possible to ensure that the duty cycle of the light emission control signal reaches the target duty cycle, and the time required to determine the pulse width of the first target level pulse is saved as well.

Figure 3:
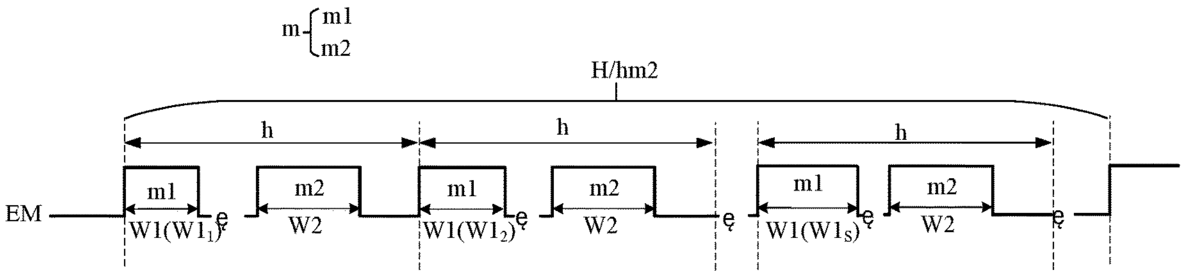
FIG. 3 is another waveform diagram of the light emission control signal of the display panel in one frame of time according to an embodiment of the present application.

FIG. 3 is another waveform diagram of the light emission control signal of the display panel in one frame of time according to an embodiment of the present application. As shown in FIG. 3, according to some embodiments of the present application, optionally, the pulse widths W1 of first target level pulses m1 in at least two pulse periods h can be different. For example, the pulse widths W1 of first target level pulses m1 of adjacent multiple pulse periods h may increase or decrease. As shown in FIG. 3, the pulse widths of S first target level pulses m1 of adjacent multiple pulse periods h are $W1_1$ to $W1_S$ respectively. S is an integer greater than 1. $W1_1$ to $W1_S$ may progressively increase in sequence. For another example, in the N pulse periods h, the pulse width W1 of an odd-numbered first target level pulse m1 may be a first pulse width, and the pulse width W1 of an even-numbered first target level pulse m1 may be a second pulse width. The first pulse width is different from the second pulse width. There are multiple implementations in which the pulse widths W1 of first target level pulses m1 in at least two pulse periods h are different. No more examples are given here.

Thus, the pulse widths W1 of first target level pulses m1 in different pulse periods h may be flexibly adjusted, so that the adjustment method of the pulse width W1 of a first target level pulse m1 may be more flexible and diversified. Thus, the adjustment range of the duty cycle of the light emission control signal may be further expanded. Moreover, the brightness adjustment range may be finer, and the dimming accuracy of the display panel is further improved.

Figure 4:
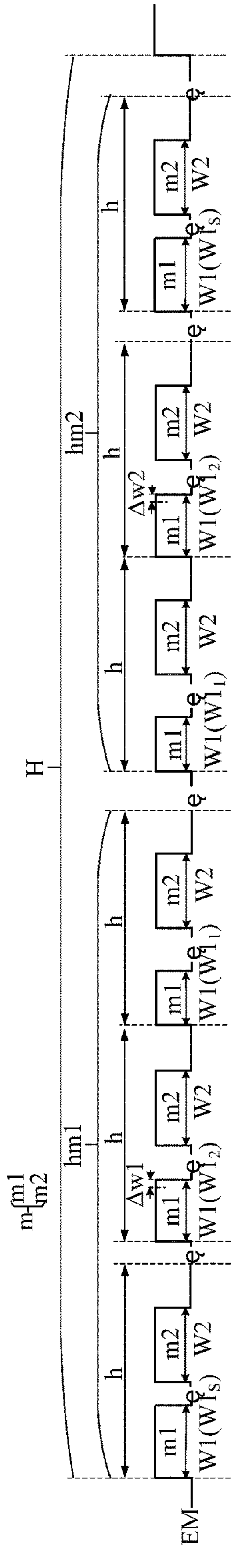
FIG. 4 is another waveform diagram of the light emission control signal of the display panel in one frame of time according to an embodiment of the present application.

FIG. 4 is another waveform diagram of the light emission control signal of the display panel in one frame of time according to an embodiment of the present application. As shown in FIG. 4, according to some embodiments of the present application, optionally, the N pulse periods h may include a first part of pulse periods hm1 and/or a second part of pulse periods hm2. The first part of pulse periods hm1 can include at least two consecutive pulse periods h. The second part of pulse periods hm2 can include at least two consecutive pulse periods h.

The pulse widths W1 of first target level pulses m1 in the first part of pulse periods hm1 decrease sequentially. The pulse widths W1 of first target level pulses m1 in the second part of pulse periods hm2 increase sequentially. That is, in the first part of pulse periods hm1, the pulse widths W1 of the first target level pulses m1 present a decreasing change, so that the smooth transition of the pulse widths W1 of the first target level pulses m1 may be implemented, thereby effectively avoiding brightness jumps. In the second part of pulse periods hm2, the pulse widths W1 of the first target level pulses m1 present an increasing change, so that the smooth transition of the pulse widths W1 of the first target level pulses m1 may also be implemented, thereby reducing brightness jumps.

It is to be noted that FIG. 4 is illustrated by using an example in which the N pulse periods h include both a first part of pulse periods hm1 and a second part of pulse periods hm2. However, in other embodiments, as shown in FIG. 3, the N pulse periods h may include only the second part of pulse periods hm2. Alternatively, the N pulse periods h may include only the first part of pulse periods hm1. This is not limited in this embodiment of the present application.

In addition, the number of pulse periods h in the first part of pulse periods hm1 and the number of pulse periods h in the second part of pulse periods hm2 may be the same or different. The specific size may be adjusted flexibly according to actual conditions. This is not limited in this embodiment of the present application.

With continued reference to FIG. 4, according to some embodiments of the present application, optionally, the N pulse periods h may include both a first part of pulse periods hm1 and a second part of pulse periods hm2. A pulse period h in the first part of pulse periods hm1 and a pulse period h in the second part of pulse periods hm2 may be different pulse periods h. That is, the pulse periods h in the first part of pulse periods hm1 are not repeated with the pulse periods h in the second part of pulse periods hm2.

The pulse widths W1 of first target level pulses m1 in multiple pulse periods h of the first part of pulse periods hm1 decrease sequentially. The pulse widths W1 of first target level pulses m1 in multiple pulse periods h of the second part of pulse periods hm2 increase sequentially.

For example, in some embodiments, the last pulse period h in the first part of pulse periods hm1 may be adjacent to the first pulse period h in the second part of pulse periods hm2, that is, the first part of pulse periods hm1 may precede the second part of pulse periods hm2. In this manner, the pulse widths W1 of the first target level pulses m1 decrease steadily at first, and then increase steadily. Thus, when the first part of pulse periods hm1 is switched to the second part of pulse periods hm2, since the pulse width of the last first target level pulse m1 in the first part of pulse periods hm1 differs slightly from the pulse width of the first one first target level pulse m1 in the second part of pulse periods hm2, it is beneficial to make the brightness transition between the adjacent first part of pulse periods hm1 and second part of pulse periods hm2 smooth, thereby reducing brightness jumps.

In some specific embodiments, when the last first target level pulse m1 in the first part of pulse periods hm1 is adjacent to the first one first target level pulse m1 in the second part of pulse periods hm2, the pulse width of the last first target level pulse m1 in the first part of pulse periods hm1 may be the same as the pulse width of the first one first target level pulse m1 in the second part of pulse periods hm2.

In this manner, since the pulse width of the last first target level pulse m1 in the first part of pulse periods hm1 is the same as the pulse width of the first one first target level pulse m1 in the second part of pulse periods hm2, the brightness transition between the adjacent first part of pulse periods hm1 and second part of pulse periods hm2 may be ensured to be smooth to a large extent, thereby reducing brightness jumps.

Figure 5:
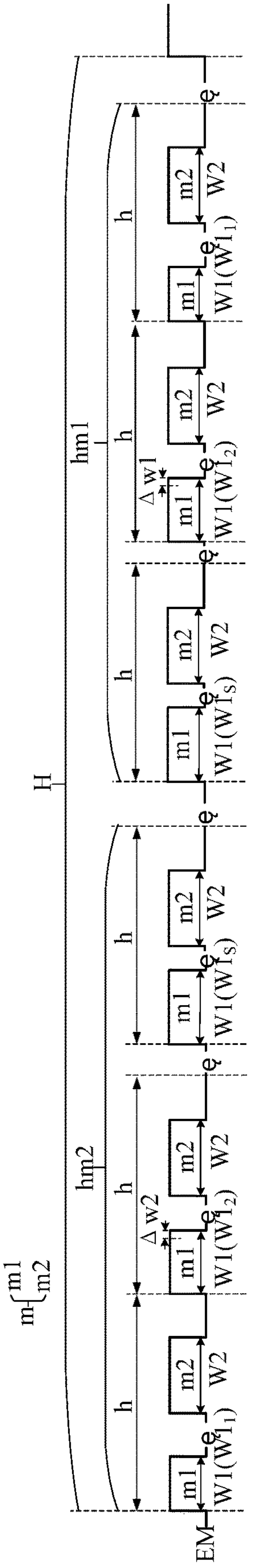
FIG. 5 is another waveform diagram of the light emission control signal of the display panel in one frame of time according to an embodiment of the present application.

FIG. 5 is another waveform diagram of the light emission control signal of the display panel in one frame of time according to an embodiment of the present application. As shown in FIG. 5, according to other embodiments of the present application, optionally, the last pulse period h in the second part of pulse periods hm2 may be adjacent to the first pulse period h in the first part of pulse periods hm1, that is, the second part of pulse periods hm2 may precede the first part of pulse periods hm1. In this manner, the pulse widths W1 of the first target level pulses m1 decrease steadily at first, and then increase steadily. Thus, when the second part of pulse periods hm2 is switched to the first part of pulse periods hm1, since the pulse width of the last first target level pulse m1 in the second part of pulse periods hm2 differs slightly from the pulse width of the first one first target level pulse m1 in the first part of pulse periods hm1, it is beneficial to make the brightness transition between the adjacent second part of pulse periods hm2 and first part of pulse periods hm1 smooth, thereby reducing brightness jumps.

In some specific embodiments, when the last first target level pulse m1 in the second part of pulse periods hm2 is adjacent to the first one first target level pulse m1 in the first part of pulse periods hm1, the pulse width of the last first target level pulse m1 in the second part of pulse periods hm2 may be the same as the pulse width of the first one first target level pulse m1 in the first part of pulse periods hm1.

In this manner, since the pulse width of the last first target level pulse m1 in the second part of pulse periods hm2 is the same as the pulse width of the first one first target level pulse m1 in the first part of pulse periods hm1, the brightness transition between the adjacent second part of pulse periods hm2 and first part of pulse periods hm1 may be ensured to be smooth to a large extent, thereby reducing brightness jumps.

Figure 6:
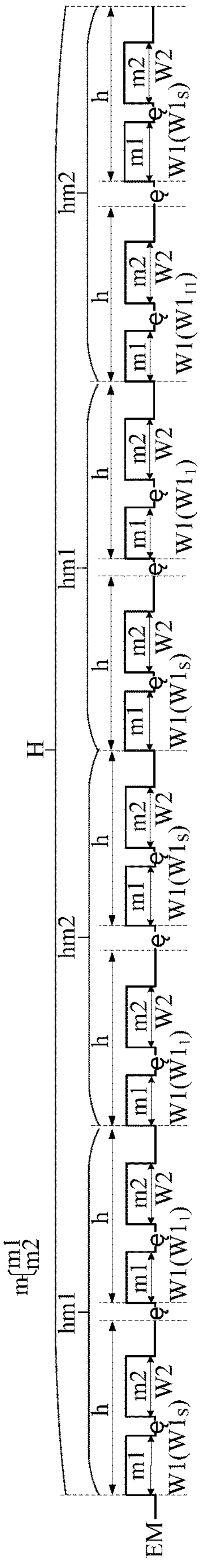
FIG. 6 is another waveform diagram of the light emission control signal of the display panel in one frame of time according to an embodiment of the present application.

FIG. 6 is another waveform diagram of the light emission control signal of the display panel in one frame of time according to an embodiment of the present application. As shown in FIG. 6, according to still other embodiments of the present application, optionally, the N pulse periods h may include multiple first parts of pulse periods hm1 and multiple second parts of pulse periods hm2. The first parts of pulse periods hm1 and the second parts of pulse periods hm2 may be alternately arranged.

In this manner, when a first part of pulse periods hm1 is switched to a second part of pulse periods hm2, since the pulse width of the last first target level pulse m1 in the first part of pulse periods hm1 differs slightly from the pulse width of the first one first target level pulse m1 in the second part of pulse periods hm2, it is beneficial to make the brightness transition between the adjacent first part of pulse periods hm1 and second part of pulse periods hm2 smooth, thereby reducing brightness jumps. When the second part of pulse periods hm2 is switched to the first part of pulse periods hm1, since the pulse width of the last first target level pulse m1 in the second part of pulse periods hm2 differs slightly from the pulse width of the first one first target level pulse m1 in the first part of pulse periods hm1, it is beneficial to make the brightness transition between the adjacent second part of pulse periods hm2 and first part of pulse periods hm1 smooth, thereby reducing brightness jumps.

As shown in FIGS. 4 and 5, according to some embodiments of the present application, optionally, the difference value between the pulse widths of two adjacent first target level pulses m1 in the first part of pulse periods hm1 can be a first difference value Δw1. The two adjacent first target level pulses m1 are used as an example. For example, the pulse width of one of the first target level pulses m1 is $W1_1$, and the pulse width of the other of the first target level pulses m1 is $W1_2$, and then $W1_2=W1_1—\Delta w1$. In the first part of pulse periods hm1, the difference value between the pulse widths of any two adjacent first target level pulses m1 can be the same.

The difference value between the pulse widths of two adjacent first target level pulses m1 in the second part of pulse periods hm2 is a second difference value Δw2. The two adjacent first target level pulses m1 are used as an example. For example, the pulse width of one of the first target level pulses m1 is $W1_1$, and the pulse width of the other of the first target level pulses m1 is $W1_2$, and then $W1_2=W1_1+\Delta w2$. In the second part of pulse periods hm2, the difference value between the pulse widths of any two adjacent first target level pulses m1 can be the same. The sizes of the first difference value Δw1 and the second difference value Δw2 may be flexibly adjusted according to actual conditions. This is not limited in this embodiment of the present application.

Thus, since the difference value between the pulse widths of two adjacent first target level pulses m1 in the first part of pulse periods hm1 is the first difference value Δw1, the pulse widths of multiple first target level pulses m1 in the first part of pulse periods hm1 may be uniformly reduced. In this manner, the brightness transition of the first part of pulse periods hm1 can be smooth, thereby reducing brightness jumps. Since the difference value between the pulse widths of two adjacent first target level pulses m1 in the second part of pulse periods hm2 is the second difference value Δw2, the pulse widths of multiple first target level pulses m1 in the second part of pulse periods hm2 may be uniformly increased. In this manner, the brightness transition of the second part of pulse periods hm2 can be smooth, thereby reducing brightness jumps.

Figure 7:
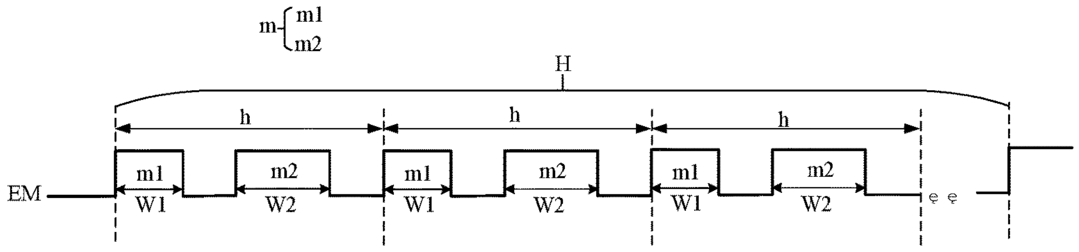
FIG. 7 is another waveform diagram of the light emission control signal of the display panel in one frame of time according to an embodiment of the present application.

FIG. 7 is another waveform diagram of the light emission control signal of the display panel in one frame of time according to an embodiment of the present application. As shown in FIG. 7, in some specific embodiments, optionally, one pulse period h may include two first level pulses m. The first first level pulse m of the two first level pulses m in the pulse period h can be the first target level pulse m1, and the second first level pulse m of the two first level pulses m in the pulse period h may be the first non-target level pulse m2. That is, an odd-numbered first level pulse m in the light emission control signal EM may be the first target level pulse m1, and an even-numbered first level pulse m in the light emission control signal EM may be the first non-target level pulse m2.

Thus, in one aspect, the pulse width of an odd-numbered first level pulse m (for example, a first target level pulse m1) in the light emission control signal is adjusted, so that the duty cycle of the light emission control signal may be adjusted in a wider range. Moreover, the brightness adjustment range may be finer, and the dimming accuracy of the display panel is improved. In another aspect, since a first level pulse m (for example, a first target level pulse m1) having a relatively small pulse width is present in the light emission control signal, the light emission control signal may still maintain a high duty cycle, thereby ensuring that the brightness of the display panel can reach the expected brightness. Thus, there is no need to perform direct current (DC) dimming in a manner of adjusting a data voltage. Alternatively, even if DC dimming is performed, the adjustment range of the data voltage can be reduced. In this manner, the power consumption is reduced.

Figure 8:
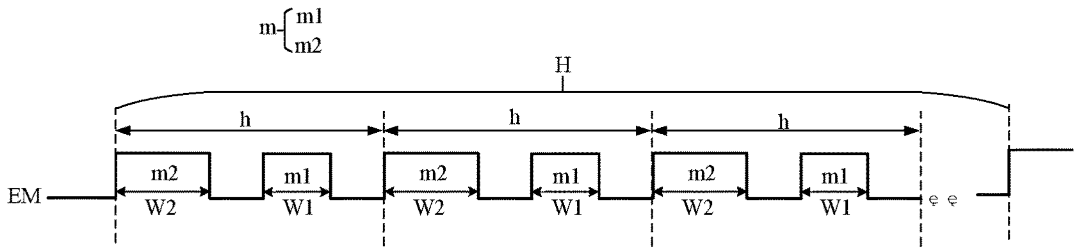
FIG. 8 is another waveform diagram of the light emission control signal of the display panel in one frame of time according to an embodiment of the present application.

FIG. 8 is another waveform diagram of the light emission control signal of the display panel in one frame of time according to an embodiment of the present application. As shown in FIG. 8, different from the embodiment shown in FIG. 7, in the embodiment shown in FIG. 8, the second first level pulse m of the two first level pulses m in the pulse period h can be the first target level pulse m1, and the first first level pulse m of the two first level pulses m in the pulse period h can be the first non-target level pulse m2.

That is, an even-numbered first level pulse m in the light emission control signal EM may be the first target level pulse m1, and an odd-numbered first level pulse m in the light emission control signal EM may be the first non-target level pulse m2.

Thus, in one aspect, the pulse width of an even-numbered first level pulse m (for example, a first target level pulse m1) in the light emission control signal is adjusted, so that the duty cycle of the light emission control signal may be adjusted in a wider range. Moreover, the brightness adjustment range may be finer, and the dimming accuracy of the display panel is improved. In another aspect, since a first level pulse m (for example, a first target level pulse m1) having a relatively small pulse width is present in the light emission control signal, the light emission control signal may still maintain a high duty cycle, thereby ensuring that the brightness of the display panel can reach the expected brightness. Thus, there is no need to perform direct current (DC) dimming in a manner of adjusting a data voltage. Alternatively, even if DC dimming is performed, the adjustment range of the data voltage can be reduced. In this manner, the power consumption is reduced.

As shown in FIG. 7 or FIG. 8, according to some embodiments of the present application, optionally, the pulse widths W1 of multiple first target level pulses m1 of the N pulse periods h may be the same, and the pulse widths W2 of multiple first non-target level pulses m2 of the N pulse periods h may be the same.

Thus, since the pulse widths W1 of the multiple first target level pulses m1 of the N pulse periods h are the same, and the pulse widths W2 of the multiple first non-target level pulses m2 of the N pulse periods h are the same, the pulses of the light emission control signal can be made relatively uniform, and the complexity of the light emission control signal is reduced. At the same time, it is beneficial to make waveforms or the proportions of light emitting time of different pulse periods h the same or similar, and brightness jumps between different pulse periods h are reduced.

Of course, in some embodiments, the pulse widths of multiple first target level pulses m1 of the N pulse periods h may also be different, and the pulse widths of multiple first non-target level pulses m2 of the N pulse periods h may also be different. For example, with reference to the preceding description of FIGS. 3 to 4, this is not limited in this embodiment of the present application.

Figure 9:
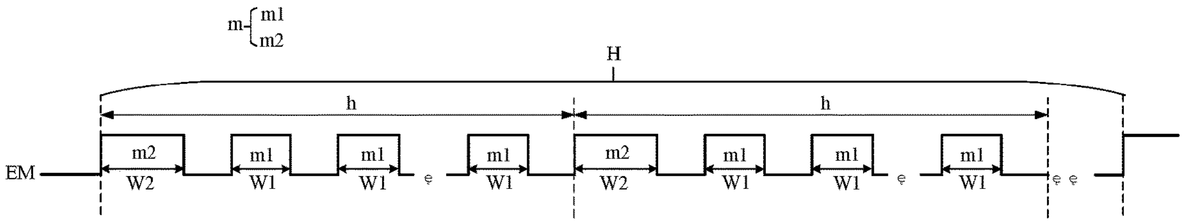
FIG. 9 is another waveform diagram of the light emission control signal of the display panel in one frame of time according to an embodiment of the present application.

FIG. 9 is another waveform diagram of the light emission control signal of the display panel in one frame of time according to an embodiment of the present application. As shown in FIG. 9, according to some embodiments of the present application, optionally, one pulse period h may include M first level pulses m. M is an integer greater than 2. That is, one pulse period h can include multiple first level pulses m. The size of M may be adjusted flexibly according to actual conditions. This is not limited in the embodiments of the present application.

With continued reference to FIG. 9, according to some embodiments of the present application, optionally, the M first level pulses m can include at least two first target level pulses m1 and at least one first non-target level pulse m2. The at least two first target level pulses m1 are consecutive first level pulses m. That is, the at least two first target level pulses m1 in the pulse period h can be consecutive, that is, the at least two first target level pulses m1 are not spaced by a first non-target level pulses m2. For example, in some specific embodiments, all of the first target level pulses m1 in the pulse period h are consecutive.

Thus, in one aspect, since one pulse period h includes at least two first target level pulses m1, the number of the first level pulses m whose pulse widths may be adjusted in the light emission control signal is increased. Thus, the adjustment range of the duty cycle of the light emission control signal is further expanded, so that the brightness adjustment range is finer, and the dimming accuracy of the display panel is improved. In another aspect, since the difference between the pulse widths of the two adjacent first target level pulses m1 is relatively small, the at least two first target level pulses m1 in the pulse period h are consecutive. Thus, the brightness jumps between the different first target level pulses m1 may be reduced, and it is beneficial to make the brightness transition smooth.

Figure 10:
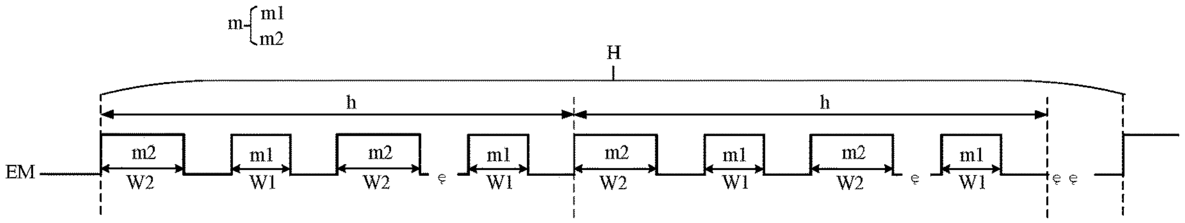
FIG. 10 is another waveform diagram of the light emission control signal of the display panel in one frame of time according to an embodiment of the present application.

FIG. 10 is another waveform diagram of the light emission control signal of the display panel in one frame of time according to an embodiment of the present application. As shown in FIG. 10, different from the embodiment shown in FIG. 9, according to other embodiments of the present application, optionally, at least two first target level pulses m1 in the pulse period h may be spaced by a first non-target level pulses m2.

Thus, for example, since the pulse widths of the first target level pulses m1 on two sides of a first non-target level pulse m2 in a pulse period h may be adjusted, the number of the first level pulses m whose pulse widths may be adjusted in the light emission control signal is increased. Thus, the adjustment range of the duty cycle of the light emission control signal is further expanded, so that the brightness adjustment range is finer, and the dimming accuracy of the display panel is improved.

In this embodiment of the present application, the number of first non-target level pulses m2 between the at least two first target level pulses m1 is not limited. At least two first target level pulses m1 in the pulse period h may be spaced by one first non-target level pulse m2 or by multiple first non-target level pulses m2. FIG. 10 is illustrated by using an example in which at least two first target level pulses m1 in the pulse period h are spaced by one first non-target level pulse m2.

Figure 11:
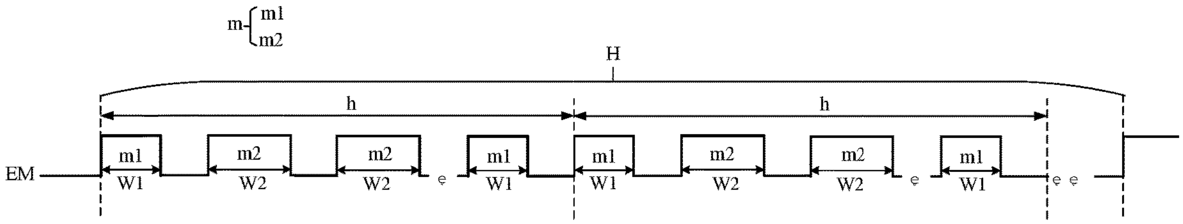
FIG. 11 is another waveform diagram of the light emission control signal of the display panel in one frame of time according to an embodiment of the present application.

FIG. 11 is another waveform diagram of the light emission control signal of the display panel in one frame of time according to an embodiment of the present application. As shown in FIG. 11, in some specific embodiments, optionally, at least two first non-target level pulses m2 may be included between two adjacent first target level pulses m1 in the pulse period h. FIG. 11 is illustrated by using an example in which two adjacent first target level pulses m1 in the pulse period h are spaced by two first non-target level pulses m2. However, more than two first non-target level pulses m2 may also be included between two adjacent first target level pulses m1 in the pulse period h. This is not limited in the present application.

Thus, since the difference between the pulse widths of the two adjacent first non-target level pulses m2 is relatively small (for example, there is no difference), the at least two first non-target level pulses m2 in the pulse period h are consecutive. Thus, the brightness jumps between the different first non-target level pulses m2 may be reduced, and it is beneficial to make the brightness transition smooth.

Figure 12:
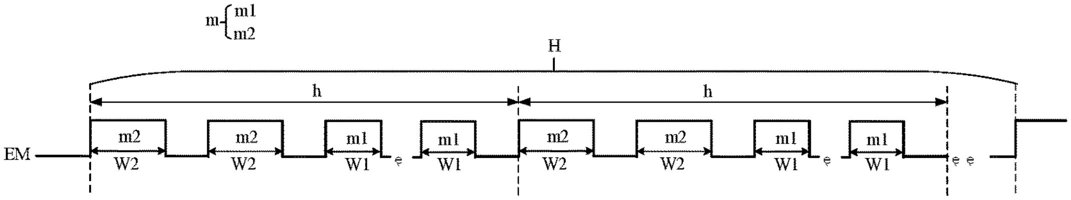
FIG. 12 is another waveform diagram of the light emission control signal of the display panel in one frame of time according to an embodiment of the present application.

FIG. 12 is another waveform diagram of the light emission control signal of the display panel in one frame of time according to an embodiment of the present application. As shown in FIG. 12, according to some embodiments of the present application, optionally, the M first level pulses m can include at least two first non-target level pulses m2 and at least one first target level pulse m1. The at least two first non-target level pulses m2 can be consecutive first level pulses m. That is, the at least two first non-target level pulses m2 in the pulse period h can be consecutive, that is, the at least two first non-target level pulses m2 are not spaced by a first target level pulses m1. For example, in some specific embodiments, all of the first non-target level pulses m2 in the pulse period h are consecutive.

Thus, since the difference between the pulse widths of the two adjacent first non-target level pulses m2 is relatively small (for example, there is no difference), the at least two first non-target level pulses m2 in the pulse period h are consecutive. Thus, the brightness jumps between the different first non-target level pulses m2 may be reduced, and it is beneficial to make the brightness transition smooth.

Figure 13:
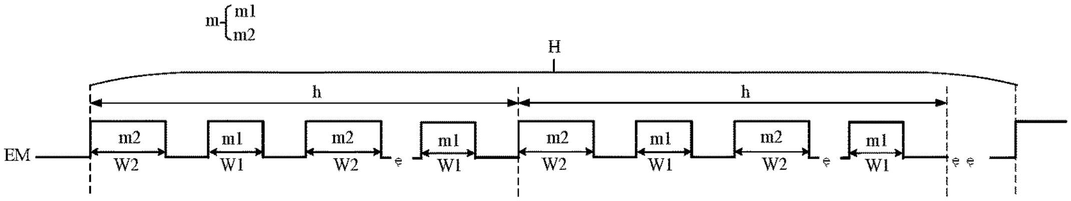
FIG. 13 is another waveform diagram of the light emission control signal of the display panel in one frame of time according to an embodiment of the present application.

FIG. 13 is another waveform diagram of the light emission control signal of the display panel in one frame of time according to an embodiment of the present application. As shown in FIG. 13, different from the embodiment shown in FIG. 12, according to other embodiments of the present application, optionally, at least two first non-target level pulses m2 in the pulse period h may be spaced by a first target level pulses m1.

In this embodiment of the present application, the number of first target level pulses m1 between the at least two first non-target level pulses m2 is not limited. At least two first non-target level pulses m2 in the pulse period h may be spaced by one first target level pulse m1 or by multiple first target level pulses m1. FIG. 13 is illustrated by using an example in which at least two first non-target level pulses m2 in the pulse period h are spaced by one first target level pulse m1.

Figure 14:
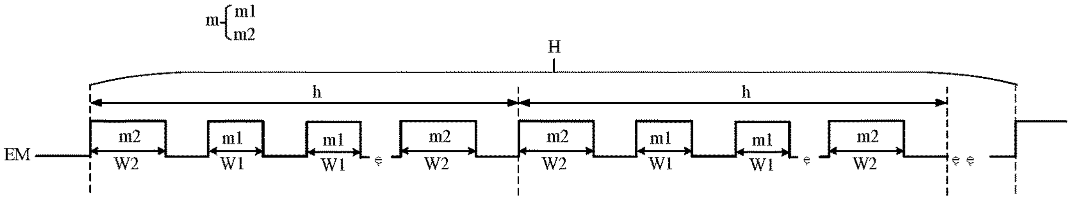
FIG. 14 is another waveform diagram of the light emission control signal of the display panel in one frame of time according to an embodiment of the present application.

FIG. 14 is another waveform diagram of the light emission control signal of the display panel in one frame of time according to an embodiment of the present application. As shown in FIG. 14, in some specific embodiments, optionally, at least two first target level pulses m1 can be provided between two adjacent first non-target level pulses m2 in the pulse period h. FIG. 14 is illustrated by using an example in which two adjacent first non-target level pulses m2 in the pulse period h are spaced by two first target level pulses m1. However, more than two first target level pulses m1 may also be included between two adjacent first non-target level pulses m2 in the pulse period h. This is not limited in the present application.

Thus, since the difference between the pulse widths of the two adjacent first target level pulses m1 is relatively small, the at least two first target level pulses m1 in the pulse period h are consecutive. Thus, the brightness jumps between the different first target level pulses m1 may be reduced, and it is beneficial to make the brightness transition smooth.

Figure 15:
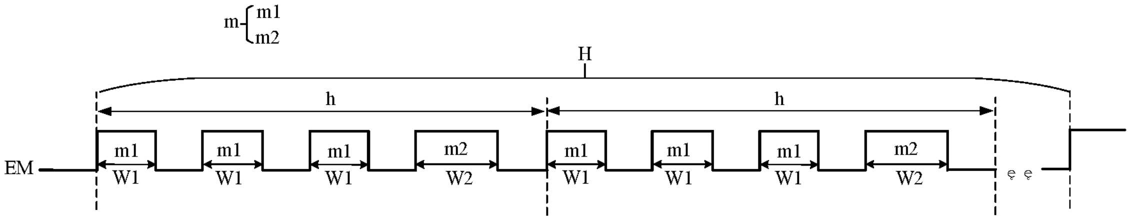
FIG. 15 is another waveform diagram of the light emission control signal of the display panel in one frame of time according to an embodiment of the present application.

FIG. 15 is another waveform diagram of the light emission control signal of the display panel in one frame of time according to an embodiment of the present application. As shown in FIG. 15, according to some embodiments of the present application, optionally, the first x first level pulses m in the pulse period h can be first target level pulses m1, and the (x+1)-th first level pulse m to the M-th first level pulse m in the pulse period h can be first non-target level pulses m2. $1 \le x < M$, and x is an integer. FIG. 15 is illustrated by using an example in which x=3 and M=4. However, x and M may also be other values. The specific sizes of x and M may be adjusted flexibly according to actual conditions. This is not limited in this embodiment of the present application.

For example, in FIG. 15, and the first first level pulse m to the third first level pulse m in each pulse period h are first target level pulses m1, and the fourth first level pulse m is a first non-target level pulse m2.

Thus, since the difference between the pulse widths of two adjacent first target level pulses m1 is relatively small, and the difference between the pulse widths of two adjacent first non-target level pulses m2 is relatively small, the first x first level pulses m in the pulse period h are first target level pulses m1, and the (x+1)-th first level pulse m to the M-th first level pulse m in the pulse period h are first non-target level pulses m2. Thus, the brightness jumps between the different first target level pulses m1 may be reduced. Moreover/Alternatively, the brightness jumps between the different first non-target level pulses m2 may be reduced, and it is beneficial to make the brightness transition smooth.

Figure 16:
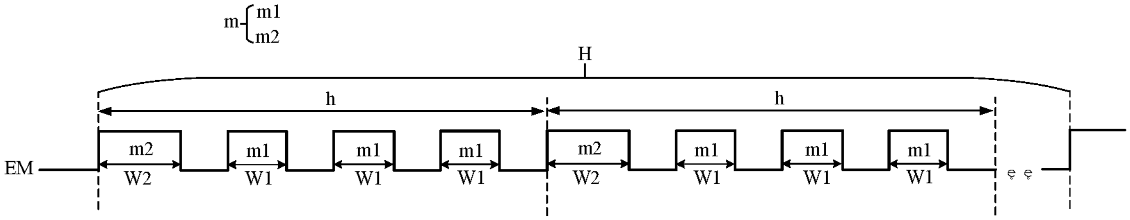
FIG. 16 is another waveform diagram of the light emission control signal of the display panel in one frame of time according to an embodiment of the present application.

FIG. 16 is another waveform diagram of the light emission control signal of the display panel in one frame of time according to an embodiment of the present application. As shown in FIG. 16, different from the embodiment shown in FIG. 15, the positions of the first target level pulses m1 and the positions of the first non-target level pulses m2 may be reversed.

Specifically, according to some embodiments of the present application, optionally, the first x first level pulses m in the pulse period h can be first non-target level pulses m2, and the (x+1)-th first level pulse m to the M-th first level pulse m in the pulse period h can be first target level pulses m1. $1 \le x < M$, and x is an integer.

FIG. 16 is illustrated by using an example in which x=1 and M=4. However, x and M may also be other values. The specific sizes of x and M may be adjusted flexibly according to actual conditions. This is not limited in this embodiment of the present application.

For example, in FIG. 16, in each pulse period h, the first first level pulse m is a first non-target level pulse m2, and the second first level pulse m to the fourth first level pulse m are first target level pulses m1.

Thus, since the difference between the pulse widths of two adjacent first target level pulses m1 is relatively small, and the difference between the pulse widths of two adjacent first non-target level pulses m2 is relatively small, the first x first level pulses m in the pulse period h are first non-target level pulses m2, and the (x+1)-th first level pulse m to the M-th first level pulse m in the pulse period h are first target level pulses m1. Thus, the brightness jumps between the different first target level pulses m1 may be reduced. Moreover/Alternatively, the brightness jumps between the different first non-target level pulses m2 may be reduced, and it is beneficial to make the brightness transition smooth.

As shown in FIG. 15 or FIG. 16, according to some embodiments of the present application, optionally, the pulse waveforms of adjacent pulse periods h can be the same. The pulse waveform of a pulse period at least includes all of the first level pulses m in the pulse period h. That is, the first level pulses m of two adjacent pulse periods h can be the same. The first level pulses m may include a first target level pulse m1 and a first non-target level pulse m2. For example, the first level pulses m may include three first target level pulses m1 and one first non-target level pulse m2.

Thus, since the first level pulses m of two adjacent pulse periods h are the same, the pulses of the light emission control signal may be made relatively uniform, and the complexity of the light emission control signal is reduced. Moreover, it is beneficial to make waveforms or the proportions of light emitting time of different pulse periods h the same, and the brightness jumps between different pulse periods h are reduced to a large extent.

Figure 17:
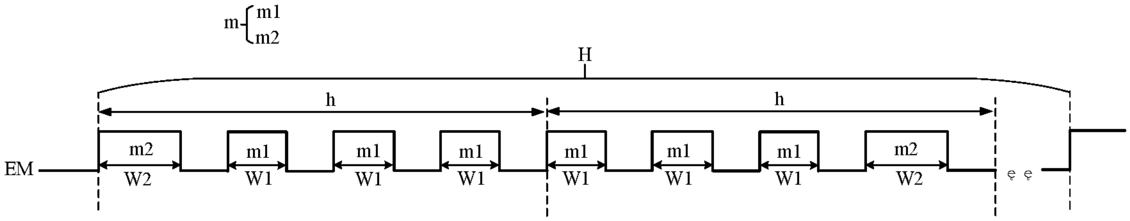
FIG. 17 is another waveform diagram of the light emission control signal of the display panel in one frame of time according to an embodiment of the present application.

FIG. 17 is another waveform diagram of the light emission control signal of the display panel in one frame of time according to an embodiment of the present application. As shown in FIG. 17, according to some embodiments of the present application, optionally, the pulse waveforms of adjacent pulse periods h can be symmetrical. The pulse waveform of a pulse period at least includes all of the first level pulses m in the pulse period h. That is, the first level pulses m of two adjacent pulse periods h may be symmetrical. The first level pulses m may include a first target level pulse m1 and a first non-target level pulse m2. For example, the first level pulses m may include three first target level pulses m1 and one first non-target level pulse m2.

For example, in FIG. 17, since the first level pulses m of two adjacent pulse periods h are symmetrical, a first target level pulse m1 of the first pulse period h1 is adjacent to a first target level pulse m1 of the second pulse period h2, a first non-target level pulse m2 of the second pulse period h2 is adjacent to a first non-target level pulse m2 of the third pulse period h3, and the rest are done in the same manner.

Since the difference between the pulse widths of two adjacent first target level pulses m1 is relatively small, and the difference between the pulse widths of two adjacent first non-target level pulses m2 is relatively small, the symmetry of the first level pulses m of two adjacent pulse periods h may reduce the brightness jump between the two adjacent pulse periods h. In this manner, the brightness transition of the two adjacent pulse periods h can be smooth.

Figure 18:
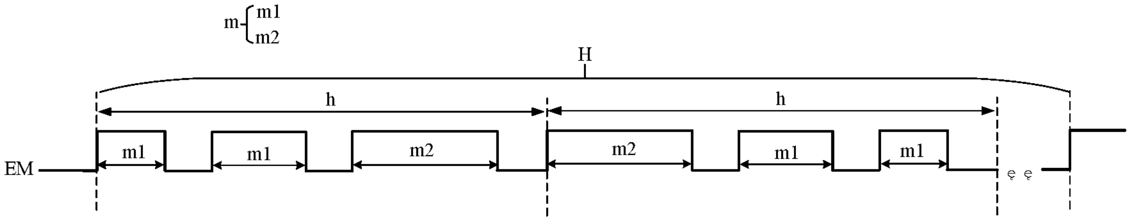
FIG. 18 is another waveform diagram of the light emission control signal of the display panel in one frame of time according to an embodiment of the present application.

FIG. 18 is another waveform diagram of the light emission control signal of the display panel in one frame of time according to an embodiment of the present application. As shown in FIG. 18, according to some embodiments of the present application, optionally, one pulse period h can include multiple consecutive first level pulses m. The pulse widths of the multiple consecutive first level pulses m in the one pulse period h may increase or decrease sequentially.

FIG. 18 is illustrated by using an example in which one pulse period h includes three first level pulses m. For example, two first level pulses m may be first target level pulses m1, one first level pulse m may be a first non-target level pulse m2. For example, the first first level pulse m and the second first level pulse m in the first pulse period h1 may be first target level pulses m1, and the third first level pulse m in the first pulse period h1 may be a first non-target level pulse m2. For example, the pulse widths of the three first level pulses m in the first pulse period h1 increase sequentially. The first first level pulse m in the second pulse period h2 may be a first non-target level pulse m2, and the second first level pulse m and the third first level pulse m in the second pulse period h2 may be first target level pulses m1. For example, the pulse widths of the three first level pulses m in the second pulse period h2 decrease sequentially.

It is to be noted that in other embodiments, the pulse widths of the three first level pulses m in the first pulse period h1 may also decrease sequentially, and the pulse widths of the three first level pulses m in the second pulse period h2 may also increase sequentially. This is not limited in this embodiment of the present application.

Thus, in one aspect, the pulse widths of multiple first level pulses m in a single pulse period h increase or decrease sequentially, so that the brightness transition in each pulse period is smooth, thereby reducing brightness jumps. In another aspect, the pulse waveforms of two adjacent pulse periods h may be symmetrical, so that the brightness transition between the two adjacent pulse periods h is smooth, thereby reducing brightness jumps.

Figure 19:
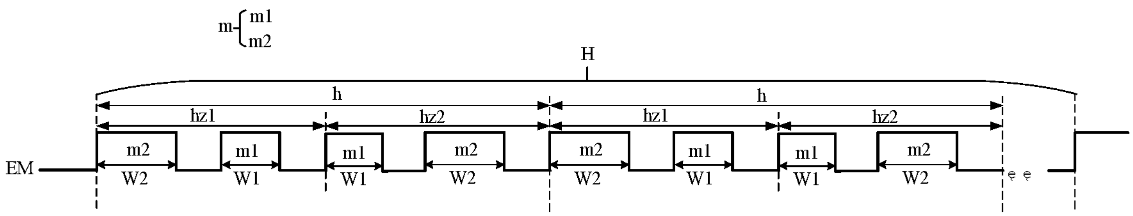
FIG. 19 is another waveform diagram of the light emission control signal of the display panel in one frame of time according to an embodiment of the present application.

FIG. 19 is another waveform diagram of the light emission control signal of the display panel in one frame of time according to an embodiment of the present application. As shown in FIG. 19, according to some embodiments of the present application, optionally, one pulse period h may include a first sub-pulse period hz1 and a second sub-pulse period hz2. The pulse waveform in the first sub-pulse period hz1 can be symmetrical to the pulse waveform in the second sub-pulse period hz2. The pulse waveform in the first sub-pulse period hz1 can at least include all of first level pulses m in the first sub-pulse period hz1. The pulse waveform in the second sub-pulse period hz2 can at least include all of first level pulses m in the second sub-pulse period hz2. The first sub-pulse period hz1 and the second sub-pulse period hz2 may each include a first target level pulse m1 and a first non-target level pulse m2.

For example, in FIG. 19, since the pulse waveform in the first sub-pulse period hz1 is symmetrical to the pulse waveform in the second sub-pulse period hz2, a first non-target level pulse m2 in the first sub-pulse period hz1 is adjacent to a first non-target level pulse m2 in the second sub-pulse period hz2. In other embodiments, the positions of first target level pulses m1 and the positions of first non-target level pulses m2 may be exchanged, that is, a first target level pulse m1 in the first sub-pulse period hz1 is adjacent to a first target level pulse m1 in the second sub-pulse period hz2.

Thus, in one aspect, multiple first level pulses m in a single pulse period h are symmetrical, so that the brightness transition in each pulse period h is smooth, thereby reducing brightness jumps. In another aspect, the pulse waveforms of two adjacent pulse periods h are symmetrical or the same, so that the brightness transition between the two adjacent pulse periods h is smooth, thereby reducing brightness jumps.

Figure 20:
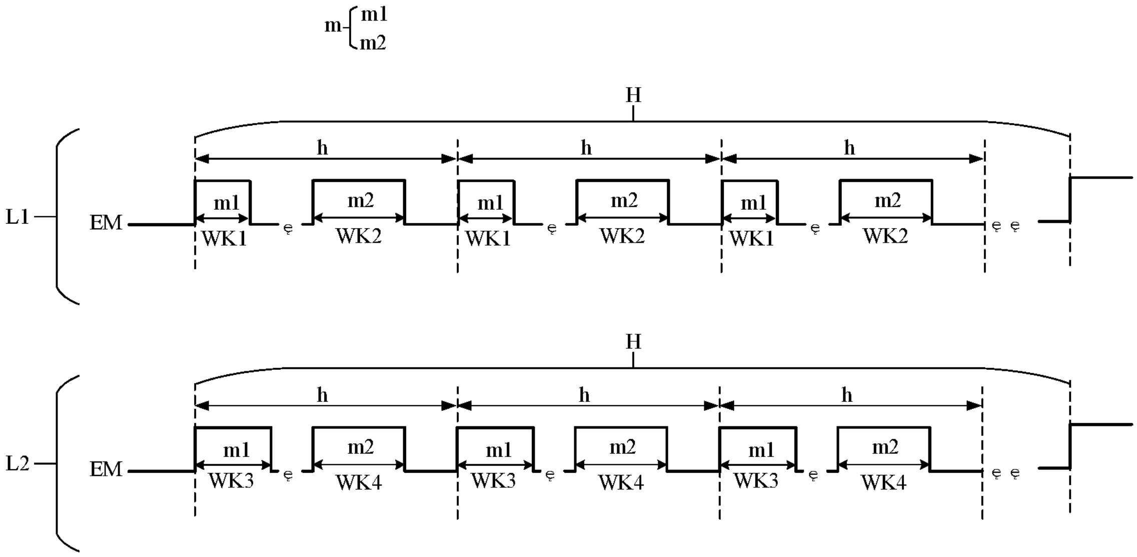
FIG. 20 is a waveform diagram of the light emission control signal of the display panel in one frame of time at different brightness levels according to an embodiment of the present application.

FIG. 20 is a waveform diagram of the light emission control signal of the display panel in one frame of time at different brightness levels according to an embodiment of the present application. As shown in FIG. 20, according to some embodiments of the present application, optionally, when the brightness level of the display panel is a first brightness level L1, the pulse width of a first target level pulse m1 can be a first pulse width WK1, and the pulse width of a first non-target level pulse m2 can be a second pulse width WK2.

When the brightness level of the display panel is a second brightness level L2, the pulse width of a first target level pulse m1 may be a third pulse width WK3, and the pulse width of a first non-target level pulse m2 may be a fourth pulse width WK4.

The first brightness level L1 is different from the second brightness level L2. That is, the brightness displayed by the display panel at the first brightness level may be different from the brightness displayed by the display panel at the second brightness level. The first pulse width WK1 may be different from the third pulse width WK3. In the embodiment shown in FIG. the second pulse width WK2 may be the same as the fourth pulse width WK4.

Thus, at different brightness levels, the pulse width of a first target level pulse m1 is flexibly adjusted, so that the duty cycle of the light emission control signal is adjusted, thereby satisfying the brightness requirements of different brightness levels. For example, each brightness level reaches its respective expected target brightness.

Figure 21:
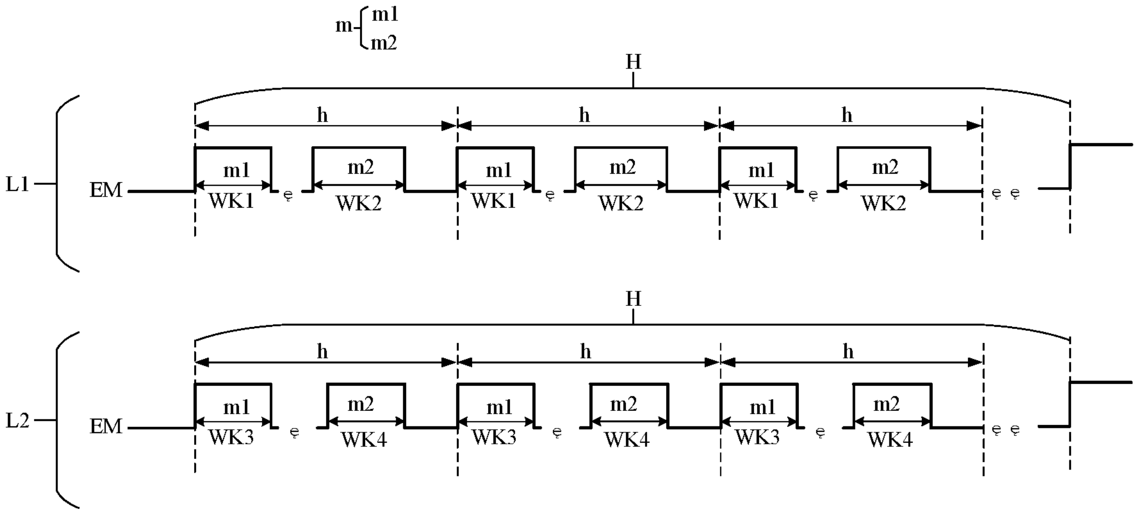
FIG. 21 is another waveform diagram of the light emission control signal of the display panel in one frame of time at different brightness levels according to an embodiment of the present application.

FIG. 21 is another waveform diagram of the light emission control signal of the display panel in one frame of time at different brightness levels according to an embodiment of the present application. As shown in FIG. 21, when the first brightness level L1 is different from the second brightness level L2, the second pulse width WK2 may be different from the fourth pulse width WK4. In the embodiment shown in FIG. 21, the first pulse width WK1 may be the same as the third pulse width WK3.

Thus, at different brightness levels, the pulse width of a first non-target level pulse m2 is flexibly adjusted, so that the duty cycle of the light emission control signal is adjusted, thereby satisfying the brightness requirements of different brightness levels. For example, each brightness level reaches its respective expected target brightness.

In still other embodiments, when the first brightness level L1 is different from the second brightness level L2, the first pulse width WK1 may be different from the third pulse width WK3, and the second pulse width WK2 may be different from the fourth pulse width WK4.

Thus, at different brightness levels, the pulse width of a first target level pulse m1 and the pulse width of a first non-target level pulse m2 are flexibly adjusted, so that the duty cycle of the light emission control signal is adjusted, thereby satisfying the brightness requirements of different brightness levels. For example, each brightness level reaches its respective expected target brightness.

With continued reference to FIG. 20, in some specific embodiments, the brightness corresponding to the first brightness level L1 is greater than the brightness corresponding to the second brightness level L2. That is, the brightness displayed by the display panel at the first brightness level may be greater than the brightness displayed by the display panel at the second brightness level. Accordingly, the first pulse width WK1 is smaller than the third pulse width WK3.

Thus, when the brightness corresponding to a brightness level is relatively high, the pulse width of a first target level pulse m1 is reduced, so that the duty cycle of the light emission control signal may be increased, thereby satisfying the brightness requirements of different brightness levels. For example, the first brightness level reaches expected first target brightness, and the second brightness level reaches expected second target brightness. The first target brightness is greater than the second target brightness.

With continued reference to FIG. 21, in some specific embodiments, when the brightness corresponding to the first brightness level L1 is greater than the brightness corresponding to the second brightness level L2, the second pulse width WK2 may be smaller than the fourth pulse width WK4.

Thus, when the brightness corresponding to a brightness level is relatively high, the pulse width of a first non-target level pulse m2 is reduced, so that the duty cycle of the light emission control signal may be increased, thereby satisfying the brightness requirements of different brightness levels. For example, the first brightness level reaches the expected first target brightness, and the second brightness level reaches the expected second target brightness. The first target brightness is greater than the second target brightness.

Figure 22:
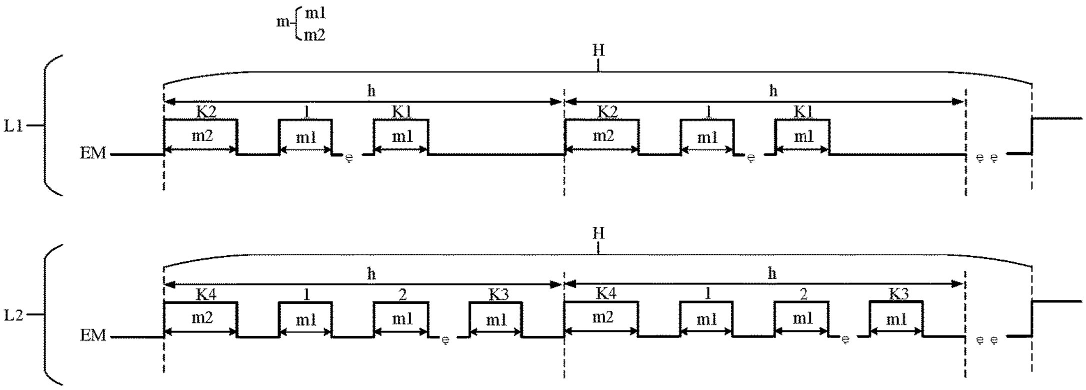
FIG. 22 is another waveform diagram of the light emission control signal of the display panel in one frame of time at different brightness levels according to an embodiment of the present application.

FIG. 22 is another waveform diagram of the light emission control signal of the display panel in one frame of time at different brightness levels according to an embodiment of the present application. As shown in FIG. 22, according to some embodiments of the present application, optionally, when the brightness level of the display panel is the first brightness level L1, the number of first target level pulses m1 in the pulse period h may be a first number K1, and the number of first non-target level pulses m2 in the pulse period h may be a second number K2.

When the brightness level of the display panel is the second brightness level L2, the number of first target level pulses m1 in the pulse period h may be a third number K3, and the number of first non-target level pulses m2 in the pulse period h may be a fourth number K4.

The first brightness level L1 is different from the second brightness level L2. That is, the brightness displayed by the display panel at the first brightness level may be different from the brightness displayed by the display panel at the second brightness level. The first number K1 may be different from the third number K3. In the embodiment shown in FIG. 22, the second number K2 may be the same as the fourth number K4.

Thus, at different brightness levels, the number of first target level pulses m1 is flexibly adjusted, so that the duty cycle of the light emission control signal is adjusted, thereby satisfying the brightness requirements of different brightness levels. For example, each brightness level reaches its respective expected target brightness.

Figure 23:
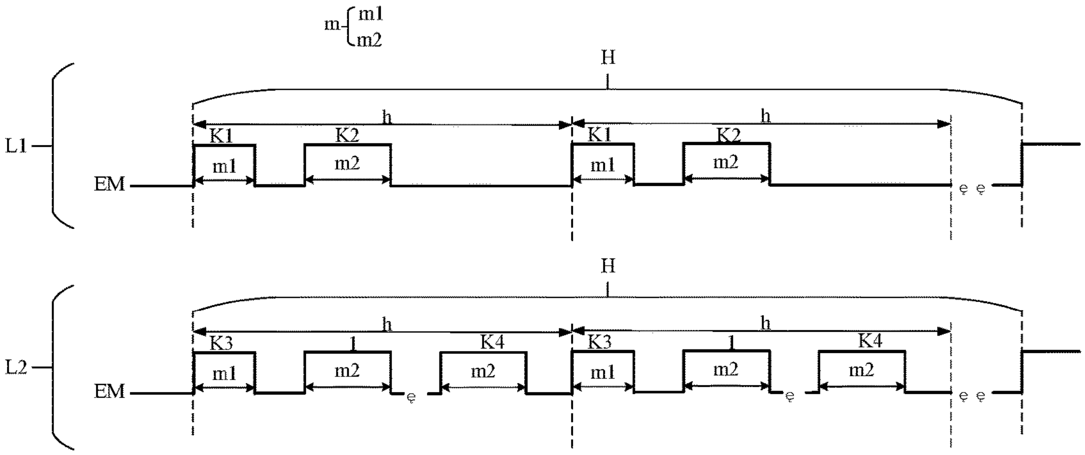
FIG. 23 is another waveform diagram of the light emission control signal of the display panel in one frame of time at different brightness levels according to an embodiment of the present application.

FIG. 23 is another waveform diagram of the light emission control signal of the display panel in one frame of time at different brightness levels according to an embodiment of the present application. As shown in FIG. 23, according to some embodiments of the present application, optionally, when the first brightness level L1 is different from the second brightness level L2, the second number K2 is different from the fourth number K4. In the embodiment shown in FIG. 23, the first number K1 may be the same as the third number K3.

Thus, at different brightness levels, the number of first non-target level pulses m2 is flexibly adjusted, so that the duty cycle of the light emission control signal is adjusted, thereby satisfying the brightness requirements of different brightness levels. For example, each brightness level reaches its respective expected target brightness.

In still other embodiments, when the first brightness level L1 is different from the second brightness level L2, the first number K1 is different from the third number K3, and the second number K2 is different from the fourth number K4.

Thus, at different brightness levels, the number of first target level pulses m1 and the number of first non-target level pulses m2 are flexibly adjusted, so that the duty cycle of the light emission control signal is adjusted, thereby satisfying the brightness requirements of different brightness levels. For example, each brightness level reaches its respective expected target brightness.

With continued reference to FIG. 22, in some specific embodiments, the brightness corresponding to the first brightness level L1 may be greater than the brightness corresponding to the second brightness level L2. That is, the brightness displayed by the display panel at the first brightness level may be greater than the brightness displayed by the display panel at the second brightness level. Accordingly, the first number K1 may be smaller than the third number K3.

Thus, when the brightness corresponding to a brightness level is relatively high, the number of first target level pulses m1 is reduced, so that the duty cycle of the light emission control signal may be increased, thereby satisfying the brightness requirements of different brightness levels. For example, the first brightness level reaches the expected first target brightness, and the second brightness level reaches the expected second target brightness. The first target brightness is greater than the second target brightness.

With continued reference to FIG. 23, in some specific embodiments, the brightness corresponding to the first brightness level L1 may be greater than the brightness corresponding to the second brightness level L2. The second number K2 may be smaller than the fourth number K4.

Thus, when the brightness corresponding to a brightness level is relatively high, the number of first non-target level pulses m2 is reduced, so that the duty cycle of the light emission control signal may be increased, thereby satisfying the brightness requirements of different brightness levels. For example, the first brightness level reaches the expected first target brightness, and the second brightness level reaches the expected second target brightness. The first target brightness is greater than the second target brightness.

Based on the display panel provided in the preceding embodiments, accordingly, an embodiment of the present application provides a dimming method of a display panel. The display panel may include the display panel provided by the preceding embodiments. Reference is made to the embodiments below.

Figure 24:
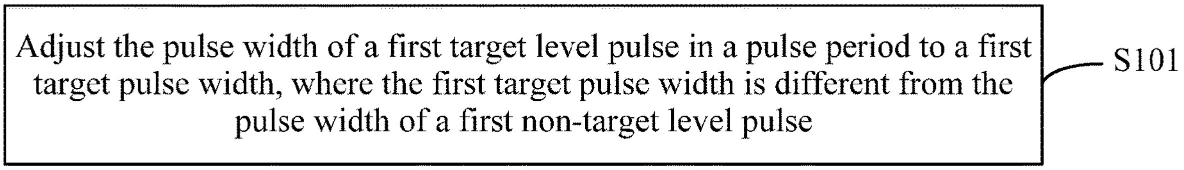
FIG. 24 is a flowchart of a dimming method of a display panel according to an embodiment of the present application.

FIG. 24 is a flowchart of a dimming method of a display panel according to an embodiment of the present application. As shown in FIG. 24, the dimming method of a display panel provided in this embodiment of the present application may include the steps below.

In S101, the pulse width of the first target level pulse in the pulse period is adjusted to a first target pulse width. The first target pulse width is different from the pulse width of the first non-target level pulse.

The first target pulse width may be flexibly adjusted according to actual conditions. This is not limited in this embodiment of the present application.

In the dimming method of a display panel of this embodiment of the present application, in one aspect, the pulse widths of partial first level pulses (for example, a first target level pulse) in the light emission control signal are adjusted, so that the duty cycle of the light emission control signal may be adjusted in a wider range. Moreover, the brightness adjustment range may be finer, and the dimming accuracy of the display panel is improved. In another aspect, since a first target level pulse or a first non-target level pulse having a relatively small pulse width is present in the light emission control signal, the light emission control signal may still maintain a high duty cycle, thereby ensuring that the brightness of the display panel can reach the expected brightness. Thus, there is no need to perform direct current (DC) dimming in a manner of adjusting a data voltage. Alternatively, even if DC dimming is performed, the adjustment range of the data voltage can be reduced. In this manner, the power consumption is reduced.

Figure 25:
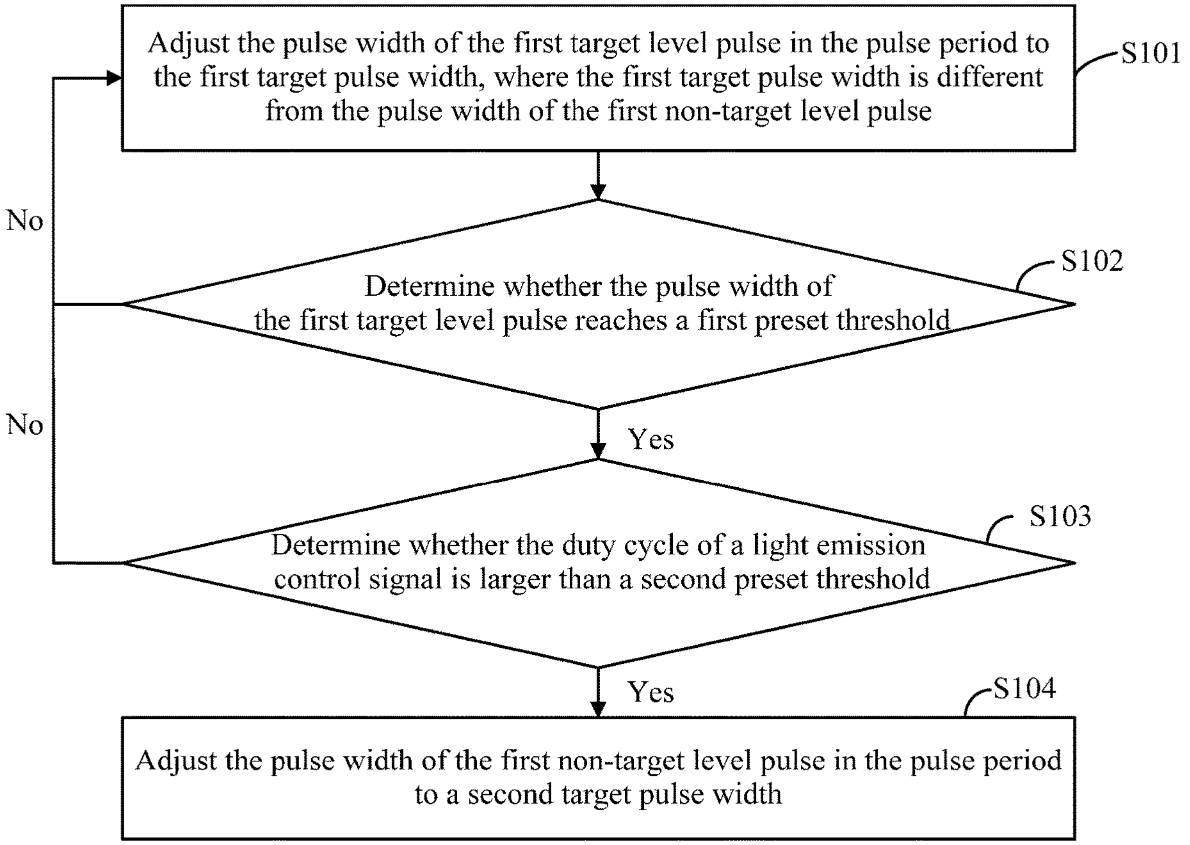
FIG. 25 is another flowchart of the dimming method of a display panel according to an embodiment of the present application.

FIG. 25 is another flowchart of the dimming method of a display panel according to an embodiment of the present application. As shown in FIG. 25, according to some embodiments of the present application, optionally, after S101, the dimming method of a display panel provided in this embodiment of the present application may also include the steps S102 to S105 below.

In S102, whether the pulse width of the first target level pulse reaches a first preset threshold is determined.

The first preset threshold may be flexibly adjusted according to actual conditions. This is not limited in this embodiment of the present application. In the practical application, for example, the pulse width of the first target level pulse may be increased until the pulse width of the first target level pulse reaches the first preset threshold.

In S103, when the pulse width of the first target level pulse reaches the first preset threshold, whether the duty cycle of the light emission control signal is larger than a second preset threshold is determined.

The second preset threshold may be flexibly adjusted according to actual conditions. This is not limited in this embodiment of the present application. The pulse width of the first target level pulse is increased, so that the duty cycle of the light emission control signal may be reduced. In S103, whether the duty cycle of the light emission control signal is still larger than the second preset threshold may be determined.

In S104, if the duty cycle of the light emission control signal is larger than the second preset threshold, the pulse width of the first non-target level pulse in the pulse period is adjusted to a second target pulse width.

When the duty cycle of the light emission control signal is still larger than the second preset threshold, the pulse width of the first target level pulse may no longer be increased, but the pulse width of the first non-target level pulse in the pulse period is adjusted. For example, the pulse width of the first non-target level pulse is increased. The second target pulse width may be flexibly adjusted according to actual conditions. This is not limited in this embodiment of the present application.

Thus, when the pulse width of the first target level pulse reaches the first preset threshold, the pulse width of the first non-target level pulse in the pulse period may be adjusted, so that the duty cycle of the light emission control signal reaches expected target duty cycle, and the brightness of the display panel reaches expected brightness.

Figure 26:
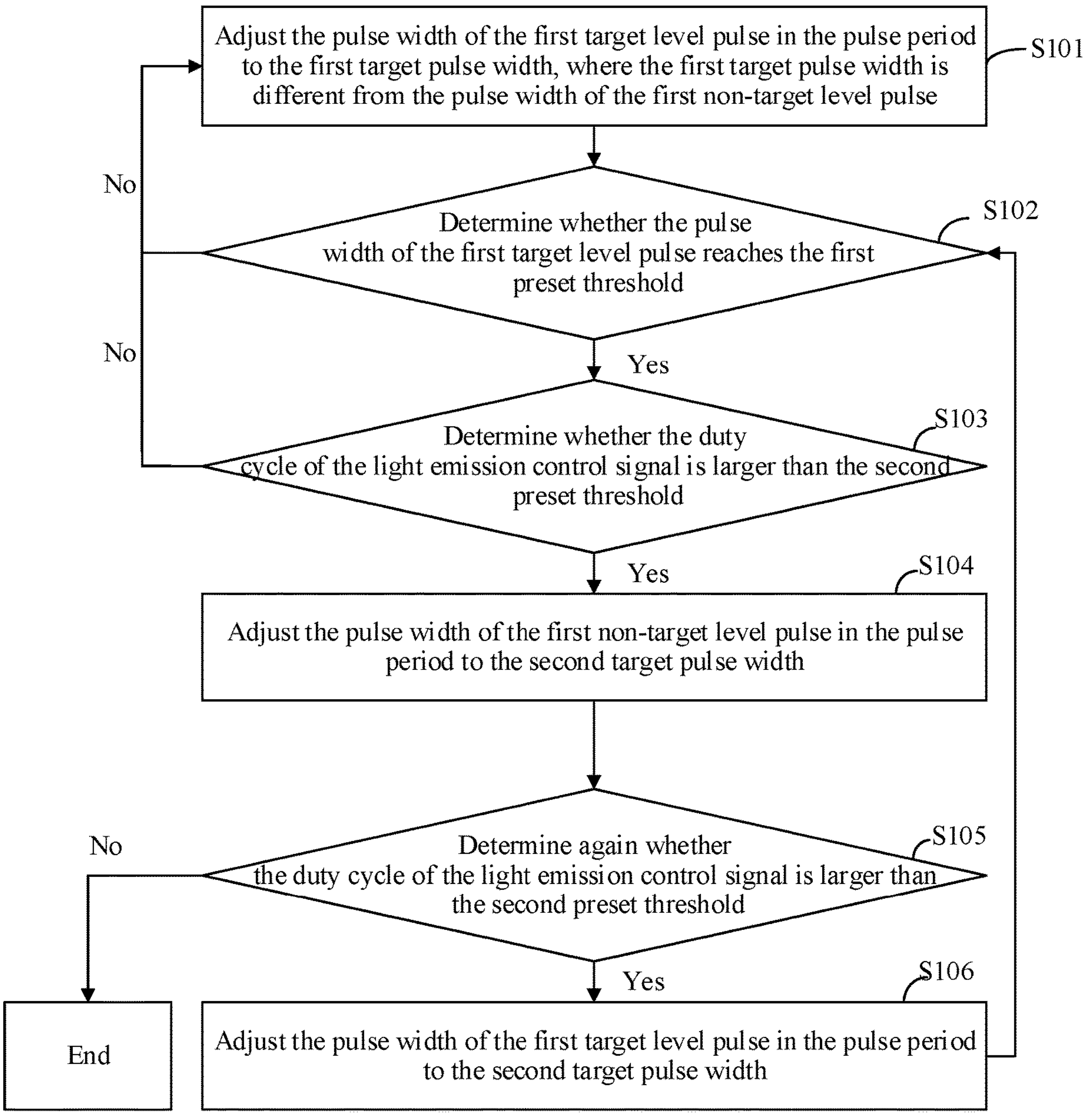
FIG. 26 is another flowchart of the dimming method of a display panel according to an embodiment of the present application.

FIG. 26 is another flowchart of the dimming method of a display panel according to an embodiment of the present application. As shown in FIG. 26, according to some embodiments of the present application, optionally, after S104, the dimming method of a display panel provided in this embodiment of the present application may also include the steps S105 and S106 below.

In S105, whether the duty cycle of the light emission control signal is larger than the second preset threshold is determined again.

After the pulse width of the first non-target level pulse is adjusted to the second target pulse width, the duty cycle of the light emission control signal may still be larger than the second preset threshold.

In S106, if the duty cycle of the light emission control signal is larger than the second preset threshold, the pulse width of the first target level pulse in the pulse period is adjusted to the second target pulse width, and step S102 and the step of determining whether the duty cycle of the light emission control signal is larger than the second preset threshold is returned or the step of determining whether the duty cycle of the light emission control signal is larger than the second preset threshold is returned until the duty cycle of the light emission control signal is smaller than or equal to the second preset threshold.

That is, the pulse width of the first target level pulse and the pulse width of the first non-target level pulse may be adjusted alternately until the duty cycle of the light emission control signal is smaller than or equal to the second preset threshold.

Thus, the pulse width of the first target level pulse and the pulse width of the first non-target level pulse are adjusted alternately, so that it is possible to reduce the difference between the pulse width of the first target level pulse and the pulse width of the first non-target level pulse. In this manner, it is beneficial to make the pulses of the light emission control signal more uniform, and the complexity of the light emission control signal is reduced, thereby reducing brightness jumps.

Figure 27:
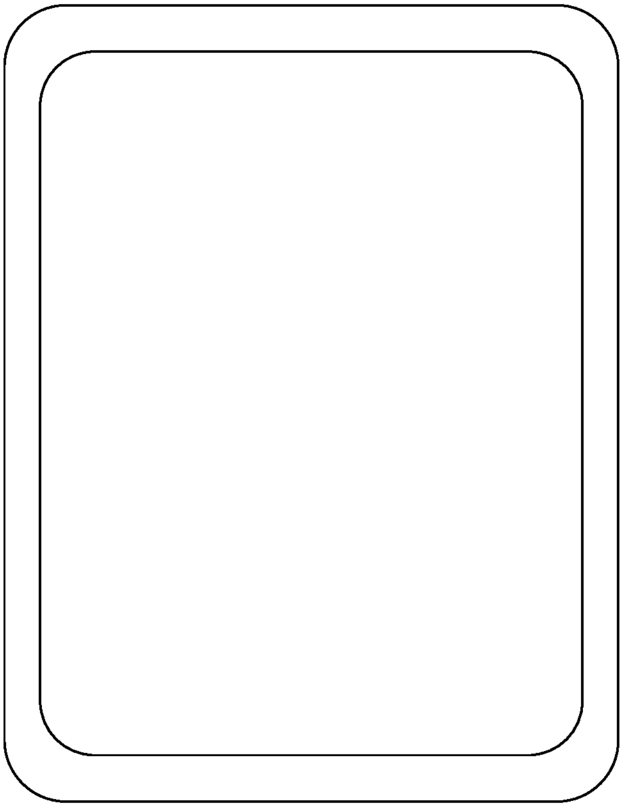
FIG. 27 is a diagram illustrating the structure of a display device according to an embodiment of the present application.

Based on the display panel provided in the preceding embodiments, accordingly, the present application also provides a display device. The display device includes the display panel provided in the present application. With reference to FIG. 27, FIG. 27 is a diagram illustrating the structure of a display device according to an embodiment of the present application. The display device 1000 provided in FIG. 27 includes the display panel provided in any one of the preceding embodiments of the present application. In the embodiment of FIG. 27, the display device 1000 is described by using a mobile phone as an example. It is to be understood that the display device provided in this embodiment of present application may be a wearable product, a computer, a television, a vehicle-mounted display device, or other display devices having display functions. This is not limited in the present application. The display device provided in this embodiment of the present application has the beneficial effect of the display panel provided in the embodiments of the present application. For details, reference may be made to the specific description of the display panel in the preceding embodiments, and the details are not repeated in this embodiment.

It is to be understood that the timing of the display panel provided in the drawings of embodiments of the present application is only a few examples and is not intended to limit the present application. In addition, if not in conflict, the preceding embodiments provided in the present application may be combined with each other.

It is to be noted that the various embodiments in the description are described in a progressive manner. The same or similar parts in the various embodiments are referred to each other. Each embodiment focuses on differences from the other embodiments. In accordance with the preceding embodiments of the present application, these embodiments do not fully describe all the details or are not intended to limit the application to the specific embodiments described. Apparently, many modifications and variations are possible in light of the preceding description. This description selects and specifically describes these embodiments to better explain the principles and practical application of the present application and to enable those skilled in the art to make good use of the present application and modifications based on the present application. The present application is limited only by the claims and their full scope and equivalents.

It should be understood by those skilled in the art that the preceding embodiments are illustrative rather than restrictive. Different technical features occurring in different embodiments may be combined to implement a beneficial effect. Other variations of the disclosed embodiments should be understood and implemented by those skilled in the art based on a study of the drawings, description, and claims. In the claims, the term "comprising" does not exclude other structures; the number involves "one" but does not exclude a plurality; and the terms "first" and "second" are used to designate names rather than to indicate any particular order. Any reference numeral in the claims is not to be construed as limiting the scope. The presence of certain technical features in different dependent claims does not imply that these technical features cannot be combined to implement beneficial effects.

What is claimed is:

1. A display panel, wherein when the display panel displays a frame of image, a light emission control signal corresponding to a row of sub-pixels in the display panel comprises N pulse periods, wherein N is a positive integer, one pulse period of the N pulse periods comprises first level pulses, the first level pulses comprise a first target level pulse and a first non-target level pulse, and a pulse width of the first target level pulse is different from a pulse width of the first non-target level pulse;

wherein the N pulse periods comprise a first part of pulse periods and a second part of pulse periods, the first part of pulse periods comprises at least two consecutive pulse periods of the N pulse periods, and the second part of pulse periods comprises at least two consecutive pulse periods of the N pulse periods;

pulse widths of first target level pulses in the first part of pulse periods decrease sequentially and pulse widths of first target level pulses in the second part of pulse periods increase sequentially, or pulse widths of first target level pulses in the first part of pulse periods increase sequentially and pulse widths of first target level pulses in the second part of pulse periods decrease sequentially; and pulse widths of first non-target level pulses in the first part of pulse periods are the same, and pulse widths of first non-target level pulses in the second part of pulse periods are the same.

2. The display panel according to claim 1, wherein a difference value between pulse widths of two adjacent first target level pulses of the first target level pulses in the first part of pulse periods is a first difference value, and a difference value between pulse widths of two adjacent first target level pulses of the first target level pulses in the second part of pulse periods is a second difference value.

3. The display panel according to claim 1, wherein the one pulse period comprises two first level pulses;

a first of the two first level pulses in the one pulse period is the first target level pulse, and a second of the two first level pulses in the one pulse period is the first non-target level pulse; or a second of the two first level pulses in the one pulse period is the first target level pulse, and a first of the two first level pulses in the one pulse period is the first non-target level pulse.

4. The display panel according to claim 1, wherein when a brightness level of the display panel is a first brightness level, the pulse width of the first target level pulse is a first pulse width, and the pulse width of the first non-target level pulse is a second pulse width; and when the brightness level of the display panel is a second brightness level, the pulse width of the first target level pulse is a third pulse width, and the pulse width of the first non-target level pulse is a fourth pulse width, wherein the first brightness level is different from the second brightness level; and the first pulse width is different from the third pulse width, and/or the second pulse width is different from the fourth pulse width.

5. The display panel according to claim 4, wherein brightness corresponding to the first brightness level is greater than brightness corresponding to the second brightness level, the first pulse width is smaller than the third pulse width, and/or the second pulse width is smaller than the fourth pulse width.

6. The display panel according to claim 1, wherein when a brightness level of the display panel is a first brightness level, a number of first target level pulses in the one pulse period is a first number, and a number of first non-target level pulses in the one pulse period is a second number; and when the brightness level of the display panel is a second brightness level, a number of first target level pulses in the one pulse period is a third number, and a number of first non-target level pulses in the one pulse period is a fourth number, wherein the first brightness level is different from the second brightness level; and the first number is different from the third number, and/or the second number is different from the fourth number.

7. A display device, comprising the display panel according to claim 1.

8. The display panel according to claim 1, wherein the pulse width of the first target level pulse is determined according to a target duty cycle of the light emission control signal expected to be reached.

9. The display panel according to claim 8, wherein the pulse width of the first target level pulse is determined according to the target duty cycle and a predetermined correspondence between the pulse width of the first target level pulse and a duty cycle of the light emission control signal.

10. The display panel according to claim 8, wherein the pulse width of the first target level pulse is calculated according to the following expression:

$$D=1-(W1*n1+W2*n2)/V$$

wherein D denotes the target duty cycle of the light emission control signal, W1 denotes the pulse width of the first target level pulse, W2 denotes the pulse width of the first non-target level pulse, n1 denotes a number of first target level pulses in the N pulse periods, n2 denotes a number of first non-target level pulses in the N pulse periods, and V denotes a number of rows of sub-pixels in the display panel.

11. The display panel according to claim 1, wherein pulse waveforms of adjacent pulse periods of the N pulse periods are symmetrical, and each of the N pulse periods comprises at least two first target level pulses and at least one first non-target level pulse.

12. The display panel according to claim 11, wherein pulse widths of a plurality of consecutive first level pulses in one of the N pulse periods increase or decrease sequentially.

13. The display panel according to claim 11, wherein pulse widths of first target level pulses in at least two pulse periods of the N pulse periods are the same, and/or pulse widths of first non-target level pulses in at least two pulse periods of the N pulse periods are the same.

14. The display panel according to claim 13, wherein the pulse width of the first target level pulse is determined according to a target duty cycle of the light emission control signal expected to be reached.

15. The display panel according to claim 14, wherein the pulse width of the first target level pulse is determined according to the target duty cycle and a predetermined correspondence between the pulse width of the first target level pulse and a duty cycle of the light emission control signal.

* * * * *